(12) United States Patent
Younger et al.

(10) Patent No.: US 12,055,035 B2
(45) Date of Patent: Aug. 6, 2024

(54) SYSTEM AND METHOD FOR DETECTING A SINKHOLE

(71) Applicant: Saudi Arabian Oil Company, Dhahran (SA)

(72) Inventors: Rae Andrew Younger, Ellon (GB); Bodong Li, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 281 days.

(21) Appl. No.: 17/452,721

(22) Filed: Oct. 28, 2021

(65) Prior Publication Data

US 2023/0137873 A1     May 4, 2023

(51) Int. Cl.
| | | |
|---|---|---|
| *E21B 47/12* | (2012.01) | |
| *E21B 44/00* | (2006.01) | |
| *E21B 47/113* | (2012.01) | |
| *E21B 49/00* | (2006.01) | |
| *G01V 9/00* | (2006.01) | |

(52) U.S. Cl.
CPC .............. *E21B 47/12* (2013.01); *E21B 44/00* (2013.01); *E21B 47/113* (2020.05); *E21B 49/00* (2013.01); *G01V 9/00* (2013.01)

(58) Field of Classification Search
CPC .. E21B 2200/20; E21B 41/0021; E21B 44/00; E21B 47/113; E21B 47/12; E21B 49/00; G01V 3/081; G01V 9/00
See application file for complete search history.

(56) References Cited

U.S. PATENT DOCUMENTS

| | | | |
|---|---|---|---|
| 6,188,962 B1 * | 2/2001 | Morgan | ................... G01V 1/24 |
| | | | 702/14 |
| 8,494,220 B2 | 7/2013 | Del Grande | |
| 9,557,434 B2 | 1/2017 | Keller et al. | |
| (Continued) | | | |

FOREIGN PATENT DOCUMENTS

| | | |
|---|---|---|
| IN | 02444DE2013 A | 5/2016 |
| KR | 20160038595 A | 4/2016 |
| (Continued) | | |

OTHER PUBLICATIONS

Haibat Ali and Jae-ho Choi; Review of Underground Pipeline Leakage and Sinkhole Monitoring Methods Based on Wireless Sensor Networking; https://www.mdpi.com/2071-1050/11/15/4007/ htm; Jul. 24, 2019.

(Continued)

*Primary Examiner* — Daniel P Stephenson
(74) *Attorney, Agent, or Firm* — Leason Ellis LLP

(57) ABSTRACT

A system and method detect an evolving sinkhole due to displacement and pose changes of a plurality of nodes distributed geographically. The system comprises a base station, a plurality of nodes, and a user device. The plurality of nodes are distributed geographically, with each node secured into the ground on the Earth's surface. A sensor senses a state of the nodes relative to the ground, including a displacement and pose changes of the nodes relative to the ground. The sensed states of the nodes used to generate a geophysical map of the ground, including the displacement and the pose change of at least one node due to an evolution of a sinkhole. An output device is configured to display the geophysical map and the sinkhole to a user.

20 Claims, 5 Drawing Sheets

(56) References Cited

U.S. PATENT DOCUMENTS

| | | | |
|---|---|---|---|
| 9,638,593 B2 | 5/2017 | Pendergrass | |
| 9,803,472 B2* | 10/2017 | Weatherhead | H04L 67/10 |
| 10,078,069 B2 | 9/2018 | Hwang et al. | |
| 10,088,586 B2 | 10/2018 | McVay et al. | |
| 11,261,719 B2* | 3/2022 | Newhouse | E21B 47/26 |
| 2004/0028476 A1* | 2/2004 | Payne | E21B 44/00 |
| | | | 405/184 |
| 2008/0094242 A1* | 4/2008 | Fedora | G01V 1/008 |
| | | | 340/690 |
| 2016/0146760 A1* | 5/2016 | Hwang | E21B 47/107 |
| | | | 73/592 |
| 2016/0341614 A1 | 11/2016 | Pendergrass | |
| 2017/0064256 A1* | 3/2017 | Richardson | E21B 47/00 |
| 2018/0128097 A1* | 5/2018 | DePavia | E21B 47/13 |
| 2020/0133298 A1 | 4/2020 | Fowler | |
| 2020/0142090 A1* | 5/2020 | Colombo | B64C 39/024 |
| 2021/0109248 A1 | 4/2021 | Wang | |
| 2021/0156810 A1 | 5/2021 | Botto et al. | |
| 2022/0025758 A1* | 1/2022 | Mora | E21B 44/00 |
| 2023/0137873 A1* | 5/2023 | Younger | E21B 41/0021 |
| | | | 175/40 |

FOREIGN PATENT DOCUMENTS

| | | | | |
|---|---|---|---|---|
| KR | 101620278 B1 | | 5/2016 | |
| KR | 20170007874 A | | 1/2017 | |
| KR | 101857961 B1 | | 5/2018 | |
| KR | 101989082 B1 | | 9/2019 | |
| KR | 102074462 B1 | | 2/2020 | |
| KR | 102365368 B1 | * | 3/2022 | |
| KR | 20230024567 A | * | 2/2023 | |
| WO | WO-2012141799 A2 | * | 10/2012 | G01V 1/30 |
| WO | 2019053524 A1 | | 3/2019 | |
| WO | WO-2021040764 A1 | * | 3/2021 | E21B 44/00 |

OTHER PUBLICATIONS

Emanuele Intrieria, et al.; Application of an ultra-wide band sensor-free wireless network for ground monitoring; https://www.sciencedirect.com/science/article/pii/S0013795217305215; May 2, 2018.

Aliyu Makama et al.; Wireless Geophone Networks for Land Seismic Data Acquisition: A Survey, Tutorial and Performance Evaluation; https://www.mdpi.com/1424-8220/21/15/5171; Jul. 31, 2021.

Chunde Liu, et al; Edge Computing for Data Anomaly Detection of Multi-Sensors in Underground Mining; https://www.mdpi.com/2079-.

Anurag Kulshrestha, et al; Sinkhole Scanner: A New Method to Detect Sinkhole-Related Spatio-Temporal Patterns in InSAR Deformation Time; https://www.mdpi.com/2072-4292/13/15/2906/htm; Jul. 24, 2021.

* cited by examiner

SYSTEM AND METHOD FOR DETECTING A SINKHOLE

FIELD OF THE DISCLOSURE

The present disclosure relates generally to geophysical monitoring, and, more particularly, to a system and method for detecting a sinkhole.

BACKGROUND OF THE DISCLOSURE

Ground instability at rig and well sites can cause sinkholes during drilling operations. The development and evolution of sinkholes has been unpredictable and can occur at locations where previous activity caused no issues. Sinkholes can be many meters in diameter and many meters deep. Sinkholes pose potential hazards to personnel, company assets, and infrastructure.

SUMMARY OF THE DISCLOSURE

According to an embodiment consistent with the present disclosure, a system and method detect an evolving sinkhole due to displacement and pose changes of a plurality of nodes distributed geographically, to detect early ground motion as an indicator and precursor of sinkhole formation.

In an embodiment, a system comprises a base station, a plurality of nodes, and a user device. The base station includes a transceiver. The plurality of nodes are distributed geographically around a rig, with each node including a housing, a ground stake coupled to the housing and configured to secure the respective node into the ground on the Earth's surface, a sensor configured to sense a state of the respective node relative to the ground, including a displacement of the respective node relative to the ground and a pose change of the respectively node relative to the ground, and to generate corresponding state data, and a transmitter configured to transmit the state data to the base station. The user device includes a receiver, a device processor, and an output device. The receiver is configured to receive the state data from the base station. The device processor is configured by code stored therein to generate, from the state data, a geophysical map of the ground, including the displacement and the pose change of at least one node due to an evolution of a sinkhole. The output device is configured to display the geophysical map and the sinkhole to a user.

The sensor is selected from the group consisting of: a global positioning system (GPS) sensor, an accelerometer, a magnetometer, a gyroscope, a Doppler measurement device, a signal time-of-fight measurement device, a triangulation device, a tilt sensor, a distance measurement device, and a barometric pressure change measurement device. The sensor can be disposed within the housing. Alternatively, the sensor can also be disposed on the ground on the Earth's surface outside of the housing. The node further includes a node processor configured by code stored therein to collect the sensor data. The sensor can be communicatively coupled to the node processor by a transmission wire. Alternatively, the sensor can be communicatively coupled to the node processor by a wireless signal.

In another embodiment, a system is configured to detect a sinkhole near a rig, and comprises a base station, a plurality of nodes, and a user device. The base station includes a transceiver. The plurality of nodes are distributed geographically around the rig, with each node including a housing, a ground stake, a plurality of sensors, and a transmitter. The ground stake is coupled to the housing and is configured to secure the respective node into the ground on the Earth's surface. Each of the plurality of sensors is configured to sense a state of the respective node relative to the ground, with the plurality of sensors including a displacement sensor configured to detect a displacement of the respective node relative to the ground, and including a pose sensor configured to detect a pose change of the respectively node relative to the ground, and to generate corresponding state data. The transmitter is configured to transmit the state data to the base station. The user device includes a receiver, a device processor, and an output device. The receiver is configured to receive the state data from the base station. The device processor is configured by code stored therein to determine, from the state data, the displacement and the pose change of at least one node, and to generate a geophysical map of the ground including the sinkhole. The output device is configured to display the geophysical map and the sinkhole therein to a user.

Each of the plurality of sensors is selected from the group consisting of: a global positioning system (GPS) sensor, an accelerometer, a magnetometer, a gyroscope, a Doppler measurement device, a signal time-of-fight measurement device, a triangulation device, a tilt sensor, a distance measurement device, and a barometric pressure change measurement device. At least one of the plurality of sensors can disposed within the housing. Alternatively, at least one of the plurality of sensors can be disposed on the ground on the Earth's surface outside of the housing. The node further includes a node processor configured by code stored therein to collect the sensor data. At least one of the plurality of sensors can be communicatively coupled to the node processor by a transmission wire. Alternatively, at least one of the plurality of sensors can be communicatively coupled to the node processor by a wireless signal.

In a further embodiment, a method is configured to detect a sinkhole near a rig, with the method comprising providing a plurality of nodes distributed geographically around the rig, securing each respective node into the ground on the Earth's surface around the rig, detecting a displacement of the respective node relative to the ground by a displacement sensor associated with a respective node, detecting a pose change of the respective node relative to the ground by a pose sensor associated with a respective node, generating corresponding state data of each respective node from the detected displacement and the detected pose change, transmitting the state data to a user device, determining the displacement and the pose change of at least one node from the state data, generating a geophysical map of the ground including the sinkhole, and displaying the geophysical map and the sinkhole therein to a user by an output device.

The displacement sensor can be selected from the group consisting of: a global positioning system (GPS) sensor, an accelerometer, a Doppler measurement device, a signal time-of-fight measurement device, a triangulation device, and a distance measurement device. The pose sensor can be selected from the group consisting of: an accelerometer, a magnetometer, a gyroscope, and a tilt sensor. At least one of the plurality of sensors can be disposed within a housing of the associated node. Alternatively, at least one of the plurality of sensors can be disposed on the ground on the Earth's surface outside of a housing of the associated node. Each of the plurality of nodes includes a node processor, and at least one of the plurality of sensors is communicatively coupled to a respective node processor by a wireless signal.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system 10 and method 100 which detect an evolving sinkhole due to displacement and pose changes of a plurality of nodes distributed geographically.

Figure 1:
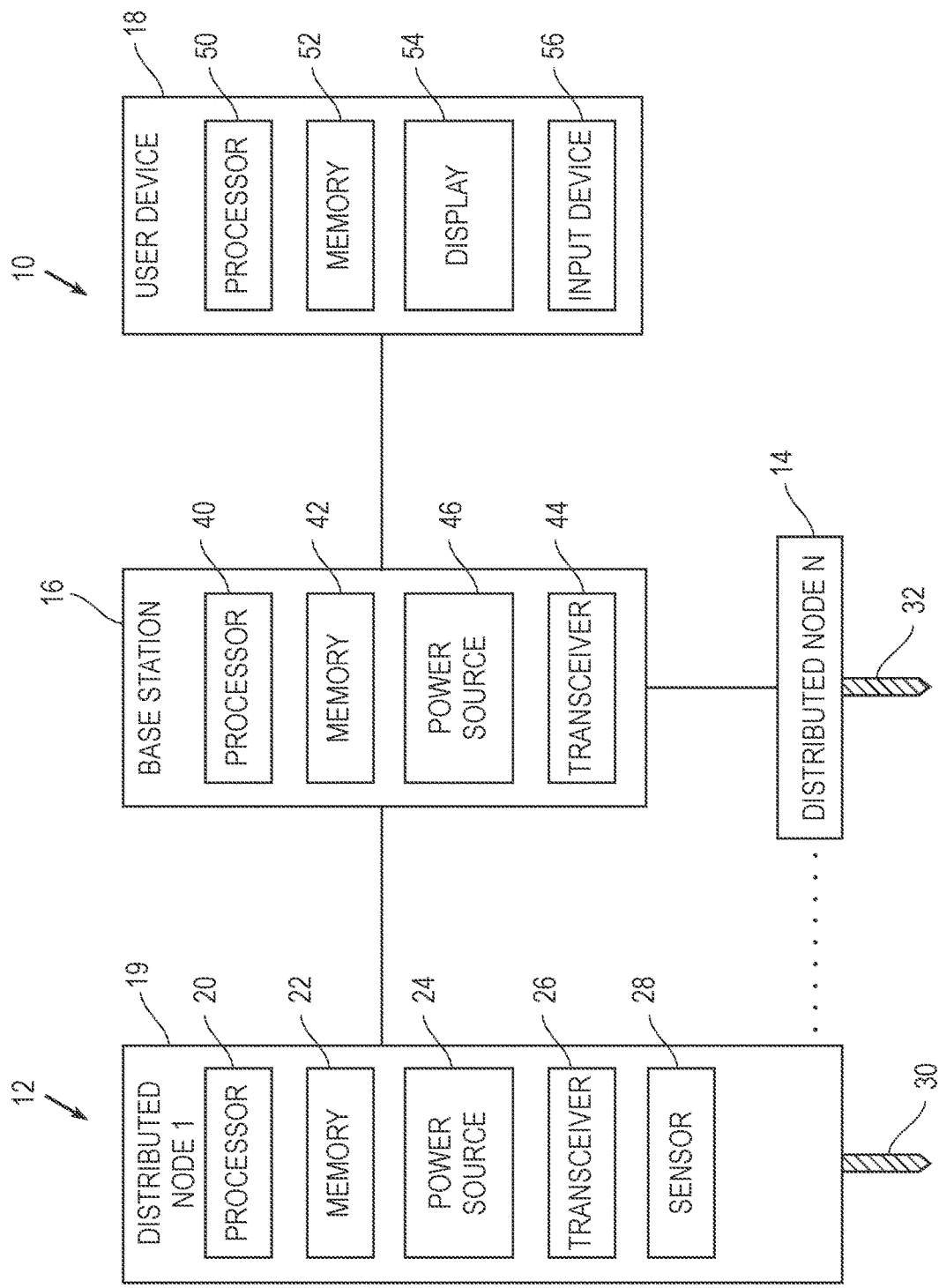
FIG. 1 is a schematic of a system for detecting sinkholes, according to an embodiment.

As shown in FIG. 1, the system 10 includes the plurality of nodes 12, 14 which are distributed geographically around a rig, as shown and described in greater detail with reference to FIGS. 3-4. The system 10 further includes a base station 16 and a user device 18. Each node 12, 14, such as the node 12, has a housing 19, a processor 20, a memory 22, a power source 24, a transceiver 26, a sensor 28, and a ground stake 30. The ground stake 30 can be composed of a rigid material, such as aluminum. The ground stake 30 extends from the housing 19. The processor 20 stores code therein or in the memory 22 such that the processor 20 is configured to collect sensor data from the sensor 28, to process the sensor data, and to transmit the sensor data to the base station 16. The power source 24 can be any known type of source of power. For example, the power source 24 can be a battery. Alternatively, the power source 24 can be a rechargeable battery. Still further, the power source 24 can be a solar panel configured to transform solar energy into electrical energy to power the node 12 and its components. In addition, the solar panel can charge a rechargeable battery, such that the rechargeable battery of the power source 24 can provide power to the node 12 and its components when solar energy is not readily available such as at night or during cloudy or inclement weather conditions.

The sensor 28 can include a displacement sensor configured to measure a geographic displacement of the sensor 28 due to a geophysical shift of the ground caused by an evolving sinkhole. The displacement sensor can be selected from the group consisting of: a global positioning system (GPS) sensor, an accelerometer, a Doppler measurement device, a signal time-of-fight measurement device, a triangulation device, and a distance measurement device. Alternatively, the sensor 28 can include a pose sensor configured to measure a change in pose or orientation of the sensor 28 due to a geophysical shift of the ground caused by an evolving sinkhole. The pose sensor can be selected from the group consisting of: an accelerometer, a magnetometer, a gyroscope, and a tilt sensor.

The plurality of nodes 12, 14 can be labeled Node 1, Node 2, . . . Node M, . . . Node N, in which N is greater than or equal to M, and M is greater than or equal to 2. Each node 12, 14 has a respective ground stake 30, 32 which allows the respective node 12, 14 to be secured on the Earth's surface at a respective location around the rig. Each node 12, 14 is communicatively coupled to the base station 16 through the transceiver 26. The nodes 12, 14 can be wirelessly coupled to the base station 16.

The base station 16 can be located on or near the rig, or remote from the rig. The base station is located in communicative proximity to each of the nodes 12, 14. The base station 16 includes a processor 40, a memory 42, a power source 44, and a transceiver 46. The processor 40 stores code therein or in the memory 42 such that the processor 40 is configured to collect sensor data from the nodes 12, 14, to process the sensor data, and to transmit the sensor data to the user device 18. The power source 44 can be any known type of source of power. For example, the power source 44 can be a battery. Alternatively, the power source 44 can be a rechargeable battery. Still further, the power source 44 can be a solar panel configured to transform solar energy into electrical energy to power the base station 16 and its components. In addition, the solar panel can charge a rechargeable battery, such that the rechargeable battery of the power source 44 can provide power to the base station 16 and its components when solar energy is not readily available such as at night or during cloudy or inclement weather conditions.

Figure 6:
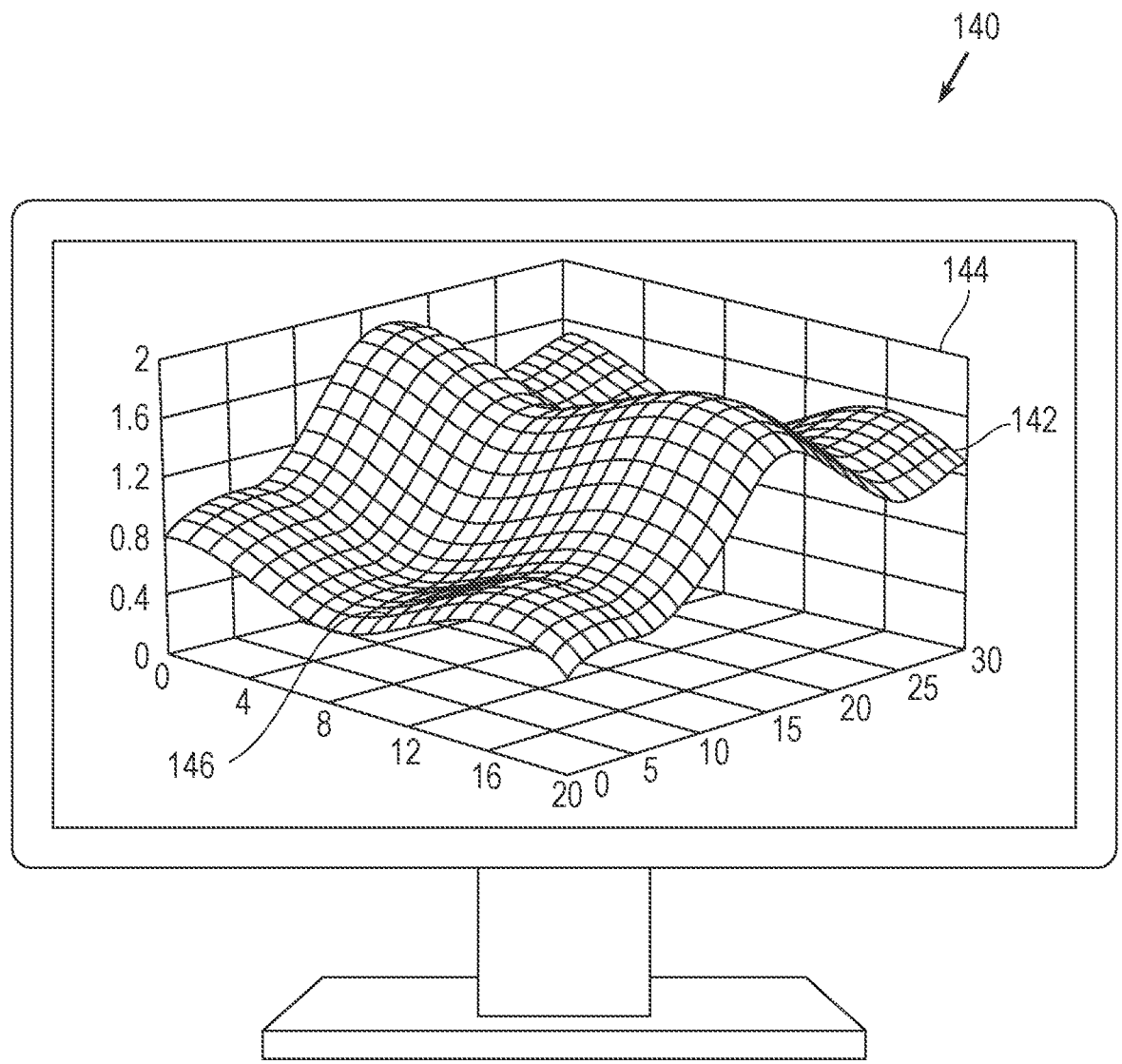
FIG. 6 illustrates an output device displaying a geophysical map.

The base station 16 is communicatively coupled to the user device 18 through the transceiver 46. The base station 16 relays the sensor data from the nodes 12, 14 to the user device 18 for processing. The user device 18 includes a processor 50, memory 52, a display 54, and an input device 56. The memory 52 can store the location of a detected sinkhole for future analysis and data processing. The input device 56 can include a receiver configured to receive the sensor data from the base station 16. The processor 50 stores code therein or in the memory 52 such that the processor 50 is configured to collect sensor data from the nodes 12, 14 and to process the sensor data. The processor 50 can include predetermined software configured to process the sensor data to determine the occurrence and evolution of any sinkholes in the geographic region near the rig and near the nodes 12, 14. In addition, using the predetermined software applied to the sensor data, the processor 50 can generate a geophysical map including any sinkholes, and can display the geophysical map and sinkholes on the display 54, such as shown in FIG. 6, described in greater detail below.

Figure 2:
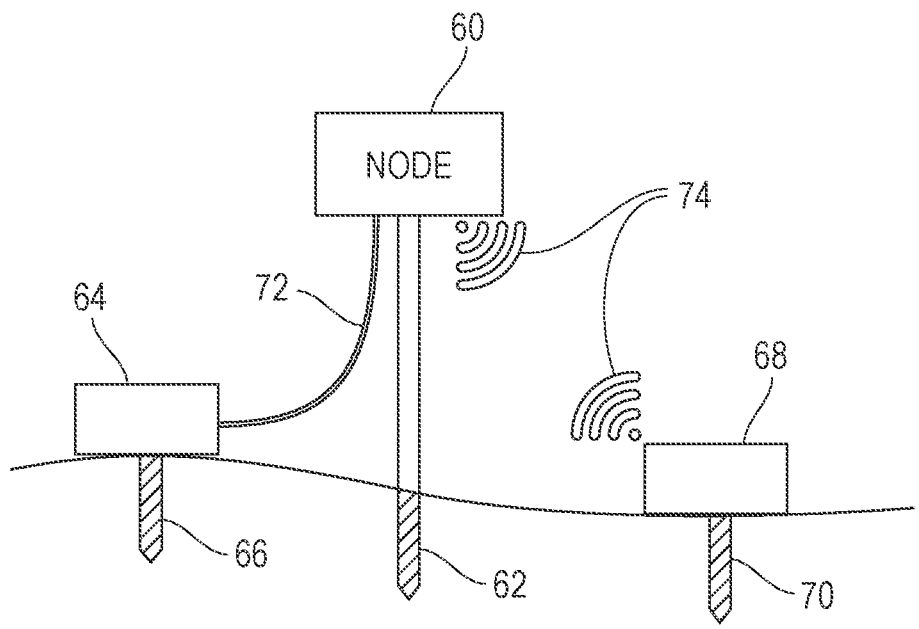
FIG. 2 illustrates a node connected by wire and connected wirelessly to sensors.

In the embodiment shown in FIG. 1, the nodes 12, 14 can include a sensor 28 in a housing 19. In an alternative embodiment, as shown in FIG. 2, each of the nodes 12, 14 can communicate with sensors outside of the housing 19. Referring to FIG. 2, each node 12, 14 can be a node 60 which includes a ground stake 62 to secure the node 60 in the ground on the Earth's surface. The node 60 is communicatively coupled to a sensor 64 having a ground stake 66 to secure the sensor 64 in the ground on the Earth's surface. In addition, the node 60 is communicatively coupled to a sensor 68 having a ground stake 70 to secure the sensor 68 in the ground on the Earth's surface. The sensor 64 can be communicatively coupled to the node 60 using a transmission line 72. The sensor 68 can be communicatively coupled to the node 60 using a wireless communication protocol 74. In this manner, each node 60 can have a wide geographic range of detection of sinkholes using a plurality of sensors 64, 68 on the Earth's surface. The nodes 12, 14, 60 with the sensors 28, 64, 68 and other components of the system 10 can be implemented at relatively low cost.

Figure 3:
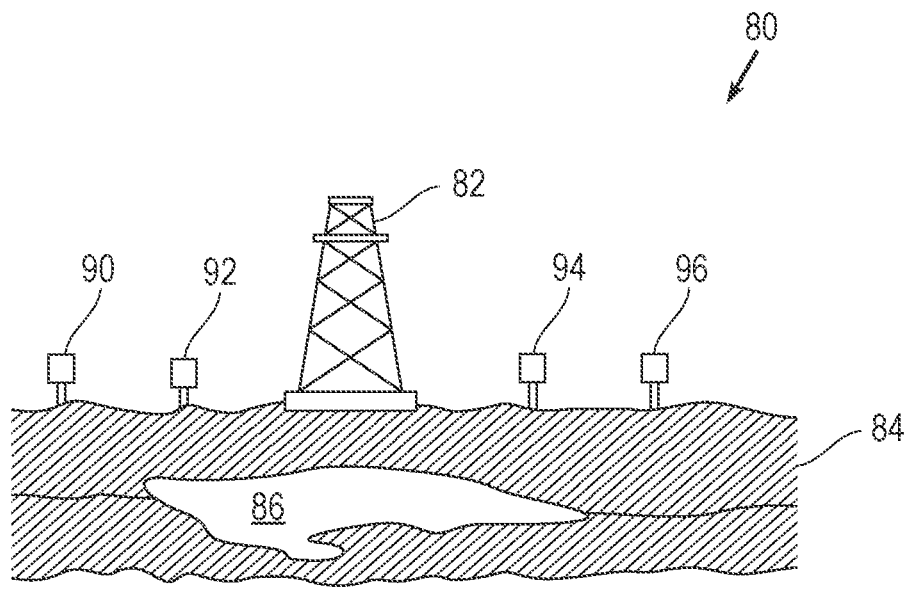
FIG. 3 illustrates placement of nodes about a rig.
Figure 4:
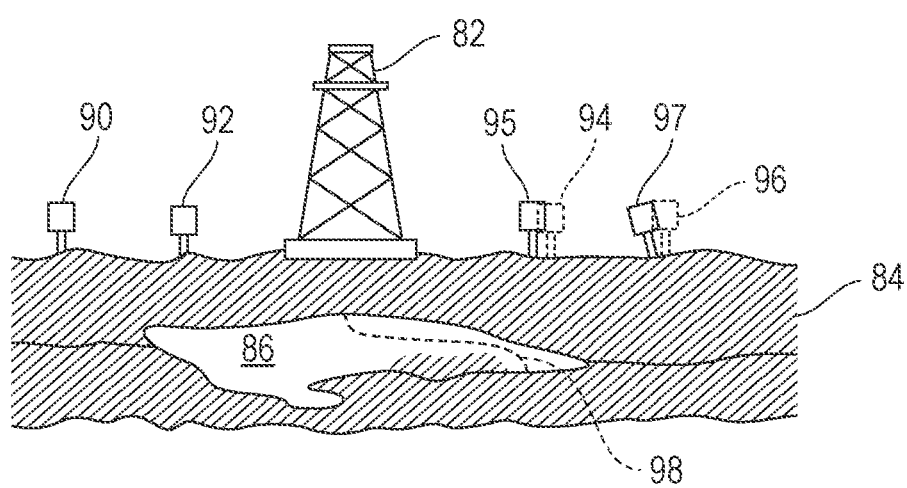
FIG. 4 illustrates movement of the nodes of FIG. 3 due to an evolving sinkhole.

Referring to FIG. 3, a configuration 80 of nodes 90, 92, 94, 96, such as the nodes 12, 14, 60 described above, is geographically distributed around a rig 82 or other structure. The rig 80 and nodes 90, 92, 94, 96 are on the Earth's surface above a formation 84 which can include a region 86 below ground. The nodes 90, 92, 94, 96 are located in initial positions and orientations above ground, as shown in FIG. 3. As material in the formation 84 and the region 86 moves, a sinkhole 98 can evolve, as shown in FIG. 4. Due to such movement of material, some nodes, such as the node 94, can be displaced to a new location 95, as shown in FIG. 4. Similarly, due to such movement of material, some nodes, such as the node 96, can have its orientation or pose altered to a new orientation or pose 97, as shown in FIG. 4. Such displacements and pose changes can be measured by the sensors in each of the nodes 90, 92, 94, 95, 96, 97. The measurements are saved as sensor data. The sensor data is transmitted by the transceiver 26 of each node to the base station 16. The sensor data is then relayed from the base station 16 to the user device 18 for further processing.

Figure 5:
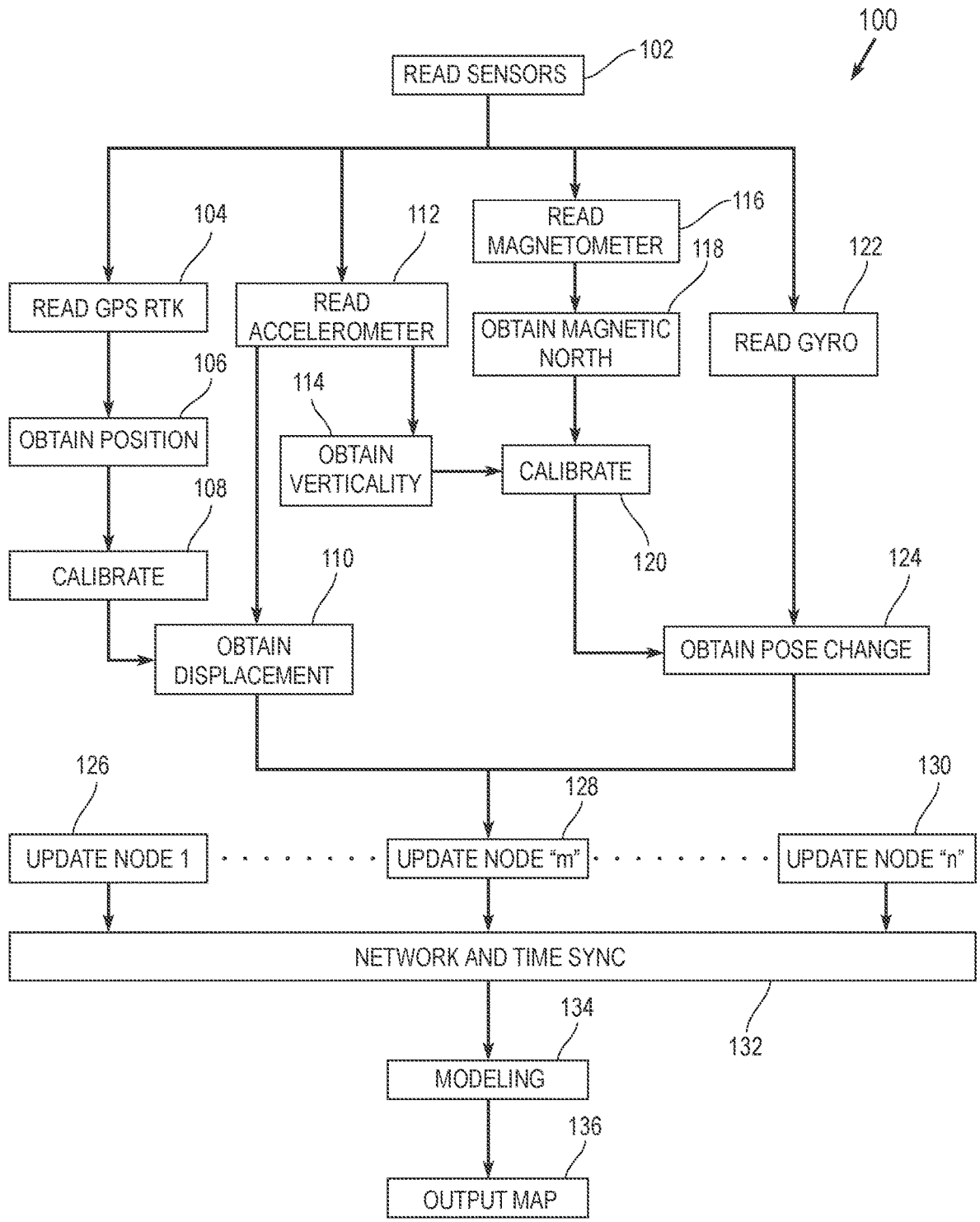
FIG. 5 is a flowchart of operation of a method according to an embodiment.

Referring to FIG. 5, a method 100 of operation of the system 10 includes reading data from the sensors 28, 64, 68 in step 102, reading position data of the sensors and their associated nodes using a Global Positioning System (GPS) employing Real Time Kinematics (RTK) in step 104, obtaining the position of the sensors and nodes in step 108, calibrating the sensors in step 110 for further sensing of positions, and obtaining a displacement measurement of the sensors and nodes in step 110. In addition, the method 100 reads acceleration measurements from an accelerometer in step 112, obtains verticality in step 114, and obtains a displacement measurement of the sensors and nodes in step 110. After step 114, the method 100 also calibrates the sensors in step 120 for further sensing of orientations or poses.

The method 100 also reads magnetic measurements from a magnetometer in step 116, obtains magnetic north in step 118, calibrates the sensors in step 120 for further sensing of orientations or poses, and obtains a pose change measurement in step 124. Further, the method 100 reads gyroscopic data from a gyroscope in step 122, and obtains a pose change measurement in step 124. After steps 110 and 124, the method 100 updates the nodes in steps 126, 128, 130 to reflect their current state due to displacement or due to a pose change. The method 100 performs network and time synchronization of the nodes 12, 14, 60 with the base station 16 in step 132. Then the method 100 performs modeling of the state data in step 134 to determine if any sinkholes are developing in the geographic area around the rig 82. The method 100 outputs a geophysical map in step 136, as shown in FIG. 6. The method 100 then can return to step 102 to perform steps 102-136 repeatedly to monitor the geographic region around a rig 82 for the evolution of sinkholes.

Referring again to FIG. 6, the user device 18 includes a display 54 having a monitor 140. The monitor 140 can display a geophysical map 142 on a three-dimensional (3D) grid representing a geographic region around the rig 82 shown in FIGS. 3-4. The geophysical map 142 can display terrain motions as a "heat map", by which the geophysical map 142 graphically shows terrain on a 3D surface with colors to signify areas of change in the terrain. The geophysical map 142 is generated by the processor 50 using survey maps, actual satellite or aerial imagery, and models of the state data from the plurality of nodes 12, 14, 60, 90, 92, 94, 95, 96, 97 and sensors 28, 64, 68. By such modeling and map generation, the geophysical map 142 can display a sinkhole 146 to a user. Legends and numerical axes on the three-dimensional grid allow a user to geographically locate the sinkhole 146. Using the map 142, the user can see at a glance the location, magnitude, and severity of ground motion, allowing appropriate action to be swiftly taken. Evacuation of personnel can avoid areas of terrain motion to minimize further risks and exposure. Automated alarm systems may also trigger when motion thresholds are exceeded. Automated processes may shut down equipment or take other actions as required.

For example, upon learning that a sinkhole is developing near a rig 82, the rig operator can determine whether the sinkhole is within a sufficient proximity to be considered a danger to the rig 82 and to rig personnel. Thus, the system 10 and method 100 can provide an early warning of developing sinkholes and dangers associated with such sinkholes. Upon identification of developing sinkholes, equipment can be re-sited and site areas cordoned off. Personnel can be moved or evacuated. Remedial repairs can be undertaken. Automated alarm systems can alert personnel, and automated shutdown procedures can be started.

The system 10 can be sufficiently sensitive to detect the presence of subterranean sinkholes and predict sinkhole formation before the rig 82 and associated infrastructure is sited. Monitoring of a site prior to rig installation can show slow subsidence or terrain motions associated with future sinkhole formation. The system 10 can replace or supplement existing site survey techniques, including ground penetrating radar and resistivity methods. A decision can then be made to re-site the rig 82 before the rig 82 is installed. Accordingly, such pre-installation assessment by the system 10 has associated cost and safety benefits. Alternatively, using the system 10, remedial repairs can be undertaken before the rig 82 is in place. Any developing sinkhole detected before siting the rig 82 and associated infrastructure can be addressed prior to capital investment in the rig 82, again delivering cost and safety benefits.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system, comprising:
    a base station including a transceiver;
    a plurality of nodes distributed geographically around a rig, with each node including:
        a housing;
        a ground stake coupled to the housing and configured to secure the respective node into the ground on the Earth's surface;
        a sensor configured to sense a state of the respective node relative to the ground, including a displacement of the respective node relative to the ground and a pose change of the respectively node relative to the ground, and to generate corresponding state data; and
        a transmitter configured to transmit the state data to the base station; and
    a user device separate from the base station, wherein the user device includes:
        a receiver configured to receive the state data from the base station;
        a device processor configured by code stored therein to generate, from the state data, a geophysical map of the ground, including the displacement and the pose change of at least one node due to an evolution of a sinkhole; and
        an output device configured to display the geophysical map and the sinkhole to a user.

2. The system of claim 1, wherein the sensor is selected from the group consisting of: a global positioning system (GPS) sensor, an accelerometer, a magnetometer, a gyroscope, a Doppler measurement device, a signal time-of-fight measurement device, a triangulation device, a tilt sensor, a distance measurement device, and a barometric pressure change measurement device.

3. The system of claim 1, wherein the sensor is disposed within the housing.

4. The system of claim 1, wherein the sensor is disposed on the ground on the Earth's surface outside of the housing.

5. The system of claim 1, wherein the node further includes:
    a node processor configured by code stored therein to collect the sensor data.

6. The system of claim 5, wherein the sensor is communicatively coupled to the node processor by a transmission wire.

7. The system of claim 5, wherein the sensor is communicatively coupled to the node processor by a wireless signal.

8. A system configured to detect a sinkhole near a rig, comprising:
    a base station including a transceiver;
    a plurality of nodes distributed geographically around the rig, with each node including:
        a housing;
        a ground stake coupled to the housing and configured to secure the respective node into the ground on the Earth's surface;
        a plurality of sensors with each sensor configured to sense a state of the respective node relative to the ground, with the plurality of sensors including a displacement sensor configured to detect a displacement of the respective node relative to the ground, and including a pose sensor configured to detect a pose change of the respectively node relative to the ground, and to generate corresponding state data; and
        a transmitter configured to transmit the state data to the base station; and
    a user device separate from the base station, wherein the user device includes:
        a receiver configured to receive the state data from the base station;
        a device processor configured by code stored therein to determine, from the state data, the displacement and the pose change of at least one node, and to generate a geophysical map of the ground including the sinkhole; and
        an output device configured to display the geophysical map and the sinkhole therein to a user.

9. The system of claim 8, wherein each of the plurality of sensors is selected from the group consisting of: a global positioning system (GPS) sensor, an accelerometer, a magnetometer, a gyroscope, a Doppler measurement device, a signal time-of-fight measurement device, a triangulation device, a tilt sensor, a distance measurement device, and a barometric pressure change measurement device.

10. The system of claim 8, wherein at least one of the plurality of sensors is disposed within the housing.

11. The system of claim 8, wherein at least one of the plurality of sensors is disposed on the ground on the Earth's surface outside of the housing.

12. The system of claim 8, wherein the node further includes:
a node processor configured by code stored therein to collect the sensor data.

13. The system of claim 12, wherein at least one of the plurality of sensors is communicatively coupled to the node processor by a transmission wire.

14. The system of claim 12, wherein at least one of the plurality of sensors is communicatively coupled to the node processor by a wireless signal.

15. A method configured to detect a sinkhole near a rig, comprising:
providing a plurality of nodes distributed geographically around the rig;
securing each respective node into the ground on the Earth's surface around the rig;
detecting a displacement of the respective node relative to the ground by a displacement sensor associated with a respective node;
detecting a pose change of the respective node relative to the ground by a pose sensor associated with a respective node;
generating corresponding state data of each respective node from the detected displacement and the detected pose change;
transmitting the state data from a base station to a user device separate from the base station;
determining, from the state data, the displacement and the pose change of at least one node;
generating, using the user device, a geophysical map of the ground including the sinkhole; and
displaying, by an output device of the user device, the geophysical map and the sinkhole therein to a user.

16. The method of claim 15, wherein the displacement sensor is selected from the group consisting of: a global positioning system (GPS) sensor, an accelerometer, a Doppler measurement device, a signal time-of-fight measurement device, a triangulation device, and a distance measurement device.

17. The method of claim 15, wherein the pose sensor is selected from the group consisting of: an accelerometer, a magnetometer, a gyroscope, and a tilt sensor.

18. The method of claim 15, wherein at least one of the plurality of sensors is disposed within a housing of the associated node.

19. The method of claim 15, wherein at least one of the plurality of sensors is disposed on the ground on the Earth's surface outside of a housing of the associated node.

20. The method of claim 15, wherein each of the plurality of nodes includes a node processor; and
wherein at least one of the plurality of sensors is communicatively coupled to a respective node processor by a wireless signal.

* * * * *